Patented Apr. 28, 1953

2,636,815

UNITED STATES PATENT OFFICE 2,636,815

AQUATIC HERBICIDE

Nicholas M. Molnar, New York, N. Y., and Ernest Segessemann, Woodridge, N. J.

No Drawing. Application May 27, 1949, Serial No. 95,879

1 Claim. (Cl. 71—2.3)

This invention relates to a composition of matter useful for killing aquatic plants.

It is known that aromatic hydrocarbons of the type as obtained from coal-tar distillates or from petroleum, when used in the form of emulsions are effective in eradicating waterweeds. This treatment, while of a certain value, has the disadvantage that after the emulsion breaks, the inner phase of the emulsion namely the hydrocarbons, having a specific gravity of less than 1 will float on the surface of the water and is thus rendered ineffective for the killing of submersed plants.

We have found that the killing effect on waterweeds of aromatic hydrocarbons can be greatly enhanced if the specific gravity is raised to greater than 1, by the dissolving therein of halogenated organic compounds. After the emulsion has reached the breaking point, the solutions of halogenated hydrocarbons in aromatic hydrocarbons settles to the bottom of the pond or canal where its killing efficiency is at a maximum by acting upon the stems and the roots of the plants.

Halogenated organic compounds suitable for admixture with the aromatic hydrocarbons are the chlorides, bromides, iodides or fluorides of aliphatic hydrocarbons, such as ethylene chloride, perchlorethylene, tetrachlorethane, pentachlorethane, hexachlorethane, tribromopropane, triiodopropane, diiodopropane and methylene fluoride, or they may be of the aromatic type, such as orthodichlorbenzene, trichlorbenzenes, tetrachlorbenzenes, etc., or the corresponding iodo and/or fluoro compounds.

As emulsifying agents any substance capable of emulsifying aromatic hydrocarbons may be used, but particularly suitable for that purpose were found to be sulfonated oils, petroleum sulfonates and soaps, either alone or in combination with each other. In some combinations, the addition of coupling agents such as hexylene glycol, diethylene glycol, or diethylene glycol ethers was found necessary to obtain a stable solution of the emulsifier in the aromatic hydrocarbons.

For a fuller understanding of the nature and the objects of the invention, reference should be had to the following examples, which are given merely to illustrate the invention and are not to be construed in a limiting sense.

Example #1

35 grams of hexachlorethane are dissolved in 65 grams of coal tar naptha having a specific gravity of 0.860 @15° C. To this solution is added 5 grams of an emulsifying agent prepared by mixing together 40 parts by weight of tall oil, 40 parts of petroleum sulfonates, 10 parts of hexylene glycol and 15 parts of potassium hydroxide solution of 45% strength. The product has a specific gravity of 1.035 @15° C. This is a uniform solution.

When the material is placed in an aquatic plant-containing irrigation ditch or pond, it forms with the water an emulsion which eventually breaks down.

Upon standing overnight, there is stratification of the mixture in the water, with a lower creamy strata consisting largely of hexachlorethane and hydrocarbons. The material of this strata descends and attacks the stems and roots of the plant growth.

Example #2

60 cc. of aromatic coal tar distillate known as "Hi Flash" naptha having a specific gravity of 0.865 @15° C. is mixed with 40 cc. of orthodichlorbenzene and with 5 cc. of the emulsifier described in Example #1. The resulting product is a clear solution having a specific gravity of 1.04 @15° C. It forms a dense white emulsion in water which separates a creamy bottom layer upon standing for several hours in the water with the effect stated in Example #1.

Example #3

30 grams of 1,2,4 trichlorbenzene are dissolved in 70 grams of a coal tar distillate having a specific gravity of .855 @15° C. 5 grams of the emulsifier described in Example #1 are then added. The product has a specific gravity of 1.03 @15° C. It produces a dense white emulsion in water which separates a creamy bottom layer on standing for several hours in the water with the effect stated in Example #1.

Example #4

40 grams of hexachlorethane are dissolved in a mixture of 130 grams of a crude coal tar naphtha and 30 grams of trichlorethylene. 10 grams of the emulsifier described in Example #1 are then added. The product is a clear liquid having a specific gravity of 1.025 at 15° C. It emulsifies readily in water with the effect stated in Example #1.

Example #5

35 grams of hexachlorethane are dissolved in 65 grams of petroleum naptha having a specific gravity of about 0.860 at 15° C. and containing a large proportion of aromatic hydrocarbons. 5 grams of the emulsifier described in Example #1.

The product has a specific gravity of 1.035 @15° C. This is a uniform solution. It forms a dense white emulsion in water which separates a creamy bottom layer upon standing for several hours in the water with the effect stated in Example #1.

Ethylene chloride, perchlorethylene, tetrachlor methane, tribromo propane, tetrachlor benzenes, methylene fluoride, may be used with the remaining constituents as hexachlorethane in Examples #1 and #4, the trichlorbenzene of Example #3 and the orthodichlorbenzene of Example #2, but in such amounts as to bring the specific gravity of the finished product above 1.

Having described our invention, what we claim as new and desire to secure by Letters Patent is:

A composition of matter suitable for killing waterweeds comprising a homogeneous mixture of about 65 parts of coal tar naphtha having specific gravity of 0.86, about 35 parts of hexachlorethane and about 5 parts of an emulsifying agent, the finished product having a specific gravity greater than 1.

NICHOLAS M. MOLNAR.
ERNEST SEGESSEMANN.

References Cited in the file of this patent

UNITED STATES PATENTS

| Number | Name | Date |
|---|---|---|
| 2,110,842 | Ressler | Mar. 8, 1938 |
| 2,447,475 | Kaberg | Aug. 17, 1948 |
| 2,450,543 | Flenner | Oct. 5, 1948 |
| 2,538,595 | Sharp | Jan. 16, 1951 |

FOREIGN PATENTS

| Number | Country | Date |
|---|---|---|
| 740,232 | France | Jan. 23, 1933 |

OTHER REFERENCES

War Dept. Technical Bulletin TB-MED 194, Aug. 17, 1945, page 24.

Water Works & Sewerage, vol. 85 (July 1938), pp. 688–690.

Water Works & Sewerage, vol. 87 (May 1940), pg. 231.

Sweet: "Oil Sprays for Weeding Carrots," N. Y. State College of Agriculture at Cornell University, Bull. V-33; revised Nov. 1946.